(12) United States Patent
Huang

(10) Patent No.: US 8,302,176 B2
(45) Date of Patent: Oct. 30, 2012

(54) VALIDITY CHECKING SYSTEM, VALIDITY CHECKING METHOD, INFORMATION PROCESSING CARD, CHECKING DEVICE, AND AUTHENTICATION APPARATUS

(75) Inventor: Lei Huang, Tokyo (JP)

(73) Assignee: NEC Corporation, Tokyo (JP)

( * ) Notice: Subject to any disclaimer, the term of this patent is extended or adjusted under 35 U.S.C. 154(b) by 525 days.

(21) Appl. No.: 12/310,920

(22) PCT Filed: Sep. 20, 2007

(86) PCT No.: PCT/JP2007/068288
§ 371 (c)(1),
(2), (4) Date: Mar. 12, 2009

(87) PCT Pub. No.: WO2008/035739
PCT Pub. Date: Mar. 27, 2008

(65) Prior Publication Data
US 2009/0260058 A1    Oct. 15, 2009

(30) Foreign Application Priority Data

Sep. 20, 2006    (JP) .................................. 2006-254365

(51) Int. Cl.
*H04L 29/06*    (2006.01)
(52) U.S. Cl. ............. 726/9; 726/4; 726/5; 726/6; 726/7; 713/168; 713/169; 713/170; 713/171
(58) Field of Classification Search ................. 726/1–36; 713/150–194
See application file for complete search history.

(56) References Cited

U.S. PATENT DOCUMENTS

| | | | | |
|---|---|---|---|---|
| 5,577,121 A | * | 11/1996 | Davis et al. ..................... | 705/67 |
| 6,076,164 A | | 6/2000 | Tanaka et al. | |
| 2004/0177280 A1 | | 9/2004 | Maruyama et al. | |

FOREIGN PATENT DOCUMENTS

| | | |
|---|---|---|
| JP | 06-289782 | 10/1994 |
| JP | 07-141480 | 6/1995 |
| JP | 10-79733 A | 3/1998 |
| JP | 11-219416 | 8/1999 |
| JP | 2001-119390 A | 4/2001 |
| JP | 2001-186122 A | 7/2001 |
| JP | 2004-206475 A | 7/2004 |
| JP | 2005-092788 A | 4/2005 |
| JP | 2005-293151 A | 10/2005 |

* cited by examiner

*Primary Examiner* — Longbit Chai
(74) *Attorney, Agent, or Firm* — Foley & Lardner LLP

(57) ABSTRACT

OBJECTIVE
A user is prevented from inadvertently inputting authentication information to an unauthorized authentication system. In this manner, authentication information leakage is certainly avoided.
SOLUTION
A validity checking system includes an information processing card, an authentication system that performs mutual authentication with the information processing card, and a checking device. The information processing card includes a validity authenticating means that authenticates the validity of the authentication system, and an impersonation preventing means that carries out an impersonation preventing process on the result of the authentication performed by the validity authenticating means. The checking device includes a verifying means that verifies the authentication result subjected to the impersonation preventing process and is output from the information processing card, and a verification result output means that outputs the result of the verification performed by the verifying means to a user in a perceptible manner. The verifying means may not be provided in the checking device, and an independent verification device may be provided.

25 Claims, 11 Drawing Sheets

FIG.9
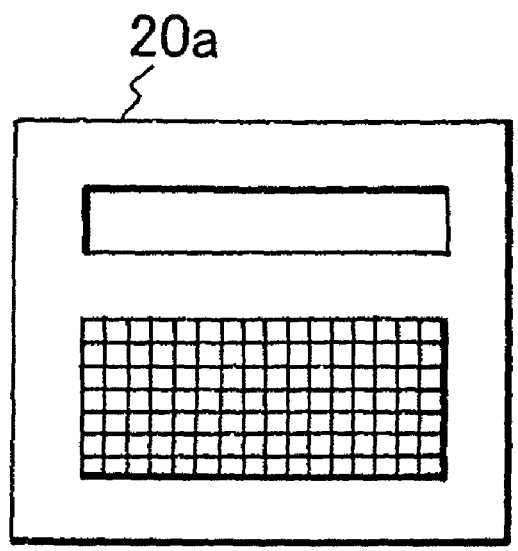
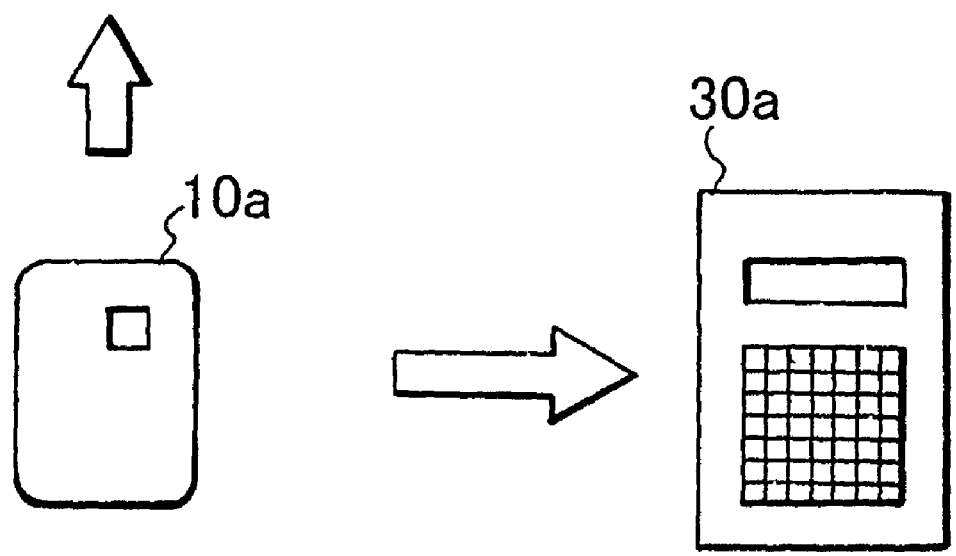

VALIDITY CHECKING SYSTEM, VALIDITY CHECKING METHOD, INFORMATION PROCESSING CARD, CHECKING DEVICE, AND AUTHENTICATION APPARATUS

TECHNICAL FIELD

The present invention relates to a validity checking system, a validity checking method, an information processing card, a checking device, and an authentication device. For example, the present invention is to be applied to a validity checking system, a validity checking method, an IC card, a checking device, and an authentication device that prevent leakage of the authentication information about a user due to impersonation in an authentication system using an IC card, and realize a safe computer system. This patent application is based upon and claims the benefit of priority of the prior Japanese Patent Application No. 2006-254365, filed on Sep. 20, 2006, and the entire contents of which are incorporated herein by reference.

BACKGROUND ART

In an authentication system for a computer system that uses an IC (integrated circuit) card, it is necessary to perform identity authentication to confirm that the user is the authorized holder of the IC card, so as to prevent unauthorized use of the IC card through a theft or the like, as disclosed in Patent Document 1. Normally, a password called PIN (personal identification number) is used in such identity authentication.

In this authentication system, mutual authentication is performed between the IC card and the authentication system terminal, so as to prove that the IC card is not an unauthorized card issued by counterfeiting or alteration, and the authentication system terminal is not an unauthorized terminal.

This technique is known as internal authentication for authenticating the validity of the IC card when seen from the side of the authentication system terminal, and is also known as external authentication for authenticating the validity of the authentication system terminal when seen from the side of the IC card.

The authentication system terminal is then put into a password input waiting state. The user inputs the password to the authentication system terminal, and the input password is compared with a password stored beforehand in the IC card, so as to perform the identity authentication.

In the above procedures, however, the authentication system terminal that requires a password has not been proved to be valid for the user.

More specifically, in a case where an unauthorized terminal is modified so as to look as if rightfully authenticated, the user cannot determine that the terminal is an unauthorized terminal. Therefore, the user is always exposed to the danger of wrongful use or theft of the password through an impersonating authentication system terminal.

To solve the above problem, Patent Document 1 discloses a device that prevents password leakage. The device has a means that reads secret information available only to a subject user from an IC card, after authenticating the validity of an authentication system terminal. The unit presents the secret information to the user, and then requests the user to input the password.

Patent Document 1: Japanese Patent Application Laid-Open No. 7-141480

DISCLOSURE OF THE INVENTION

Problems to be Solved by the Invention

By the technique disclosed in Patent Document 1, however, there is a possibility that a third party with intentions takes a look at the contents of the secret information available only to the user, when the secret information is displayed on the terminal in a conventional password leakage prevention device.

There still remains the problem of the risk that the password of the user is wrongfully used, if the stolen secret information is used to a forged impersonating authentication system terminal or the like.

The present invention has been made in view of the above circumstances, and an object thereof is to provide a validity checking system, a validity checking method, an information processing card, a checking device, and an authentication device that enable the holder of the information processing card such as an IC card to check the result of authentication so as to determine whether authentication of the validity of the authentication system has been performed properly with the information processing card, and prevent the user from inadvertently inputting authentication information to a forged authentication system terminal, so as to certainly avoid authentication information leakage.

Means to Solve the Problems

A validity checking system according to the present invention includes an information processing card that has an information processing function, and an authentication system that performs mutual authentication with the information processing card. In this validity checking system, the information processing card includes:

a validity authenticating means that authenticates the validity of the authentication system; and an impersonation preventing means that carries out an impersonation preventing process on the result of the authentication performed by the validity authenticating means, and the validity checking system further includes a checking device that includes a verifying means that receives the authentication result that is subjected to the impersonation preventing process and is output from the information processing card, and verifies the authentication result, and a verification result output means that outputs the result of the verification performed by the verifying means to a user in a perceptible manner.

A validity checking system according to the present invention includes an information processing card that has an information processing function, and an authentication system that performs mutual authentication with the information processing card. In this validity checking system, the information processing card includes:

a validity authenticating means that authenticates the validity of the authentication system; and an impersonation preventing means that performs an impersonation preventing process on the result of the authentication performed by the validity authenticating means, and the validity checking system further includes:

a verification device that includes the verifying means that receives the authentication result that is subjected to the impersonation preventing process and is output from the information processing card, and verifies the authentication result; and a checking device that includes a verification result output means that outputs the result of the verification received from the verification device to a user in a perceptible manner.

A validity checking method according to the present invention is used in a validity checking system that includes an information processing card, an authentication system that performs mutual authentication with the information processing card, and a checking device that receives information output from the information processing card.

This validity checking method includes:

a validity authenticating step that is carried out by the information processing card to authenticate the validity of the authentication system;

an impersonation preventing step that is carried out by the information processing card to carry out an impersonation preventing process on the result of the authentication performed in the validity authenticating step;

an authentication result outputting step that is carried out by the information processing card to output the authentication result subjected to the impersonation preventing process to outside;

a verifying step that is carried out by the checking device to receive the authentication result that is subjected to the impersonation preventing process and is output from the information processing card, and verify the authentication result; and a verification result outputting step that is carried out by the checking device to output the result of the verification performed in the verifying step to a user in a perceptible manner.

A validity checking method according to the present invention is used in a validity checking system that includes an information processing card, an authentication system that performs mutual authentication with the information processing card, a verification device that receives information output from the information processing card, and a checking device that receives a verification result output from the verification device.

This validity checking method includes:

a validity authenticating step that is carried out by the information processing card to authenticate the validity of the authentication system;

an impersonation preventing step that is carried out by the information processing card to carry out an impersonation preventing process on the result of the authentication performed in the validity authenticating step;

an authentication result outputting step that is carried out by the information processing card to output the authentication result subjected to the impersonation preventing process to the verification device;

a verifying step that is carried out by the verification device to verify the authentication result subjected to the impersonation preventing process;

a first verification result outputting step that is carried out by the verification device to send the verification result to the checking device; and a second verification result outputting step that is carried out by the checking device to output the verification result to a user in a perceptible manner.

Effects of the Invention

In accordance with the present invention, an IC card authenticates the validity of an IC card authentication system, and subjects the authentication result to an impersonation preventing process. The processed authentication result is transmitted to a checking device outside the IC card. The checking device or a verification device verifies the authentication result subjected to the impersonation preventing process, and outputs the verification result to the user of the IC card in a perceptible manner. In this manner, the user can be prevented from inadvertently inputting the authentication information to a forged authentication system. Thus, the present invention can provide a validity checking system, a validity checking method, an information processing card, a checking device, and an authentication device that can certainly prevent authentication information leakage.

BRIEF DESCRIPTION OF THE DRAWINGS

FIG. 9 is a schematic view of an IC card authentication system in accordance with a second embodiment of the present invention;

EXPLANATION OF REFERENCE SYMBOLS

Figure 1:
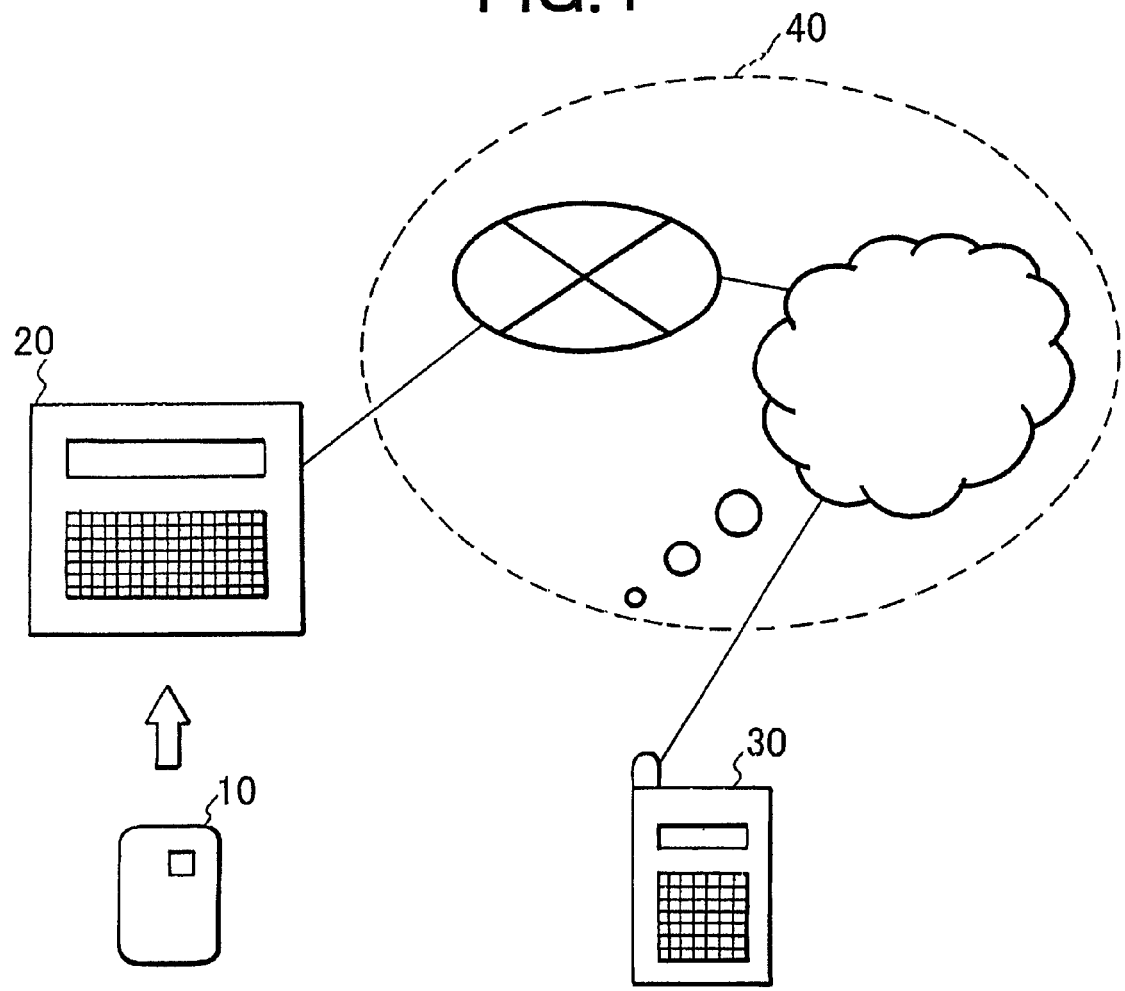
FIG. 1 is a schematic view of an IC card authentication system in accordance with a first embodiment of the present invention.

10 IC card
10a IC card
11 CPU
12 RAM
13 ROM
14 EEPROM
15 interface unit
16 contact terminal
17 authentication program
20 authentication system terminal
20a authentication system terminal
21 CPU
22 RAM
23 ROM
24 EEPROM
25 IC card interface unit
26 communication interface unit
27 keypad
28 display
30 portable checking device
30a portable checking device
31 antenna coil 32 radio unit
33 control unit
34 memory
35 display unit
36 operating unit
37 speaker
38 vibrator
39 card public key
40 communication line
50 verification device
51 CPU
52 RAM
53 ROM
54 IC card interface unit
55 display
141 card secret key
142 card public key
143 card public key certificate
144 certification authority public key
145 card holder authentication information
146 notification address information
147 terminal authentication result information
241 terminal secret key
242 terminal public key
243 terminal public key certificate
244 certification authority public key
331 voice communication function
332 mail transmitting and receiving function

BEST MODE FOR CARRYING OUT THE INVENTION

The following is a description of embodiments of the present invention, with reference to the accompanying drawings.

First Embodiment

Structure of Authorization System

FIG. 1 is a schematic view showing the structure of an authentication system using an IC card as a first embodiment of the present invention. The authentication system using an IC card shown in FIG. 1 includes an IC card 10, an authentication system terminal 20, a portable checking device 30, and a communication line 40 that connects the authentication system terminal 20 and the portable checking device 30. The IC card 10 serves as an information processing card that has an information processing function.

The communication line 40 is a telephone line, the Internet, a radiowave connection (wireless communication), or the like.

When receiving various services with an IC card, a user inserts the IC card 10 to the authentication system terminal 20, and inputs a password (equivalent to authentication information) through a keypad of the authentication system terminal 20.

The authentication system terminal 20 uses the input password to perform user identity authentication. After succeeding in the user identity authentication, the authentication system terminal 20 provides services to the user.

Figure 2:
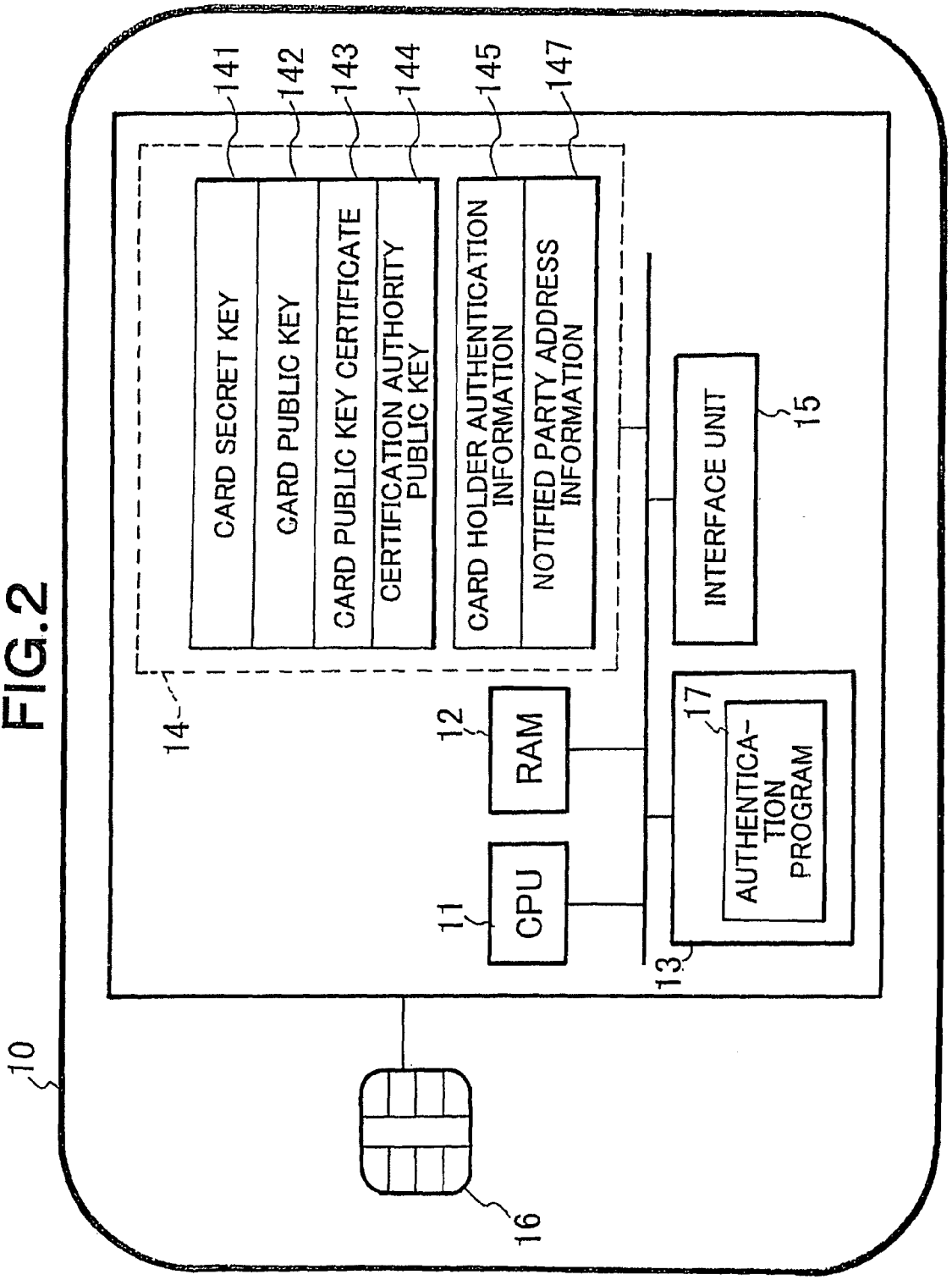
FIG. 2 is a block diagram showing the structure of an IC card in accordance with the first embodiment of the present invention.

FIG. 2 is a block diagram showing the structure of the IC card 10 serving as the information processing card. The IC card 10 shown in FIG. 2 includes a CPU (Central Processing Unit) 11, a RAM (Random Access Memory) 12, a ROM (Read Only Memory) 13, an EEPROM (Electrically Erasable and Programmable Read-Only Memory) 14, an interface unit 15, and a contact terminal 16.

The CPU 11 operates in accordance with a program, and controls the processing of the IC card 10. The RAM 12 is a readable and writable volatile memory that stores programs and data. The ROM 13 is a read-only nonvolatile memory, and stores an authentication program 17.

The CPU 11 reads the authentication program 17 into the RAM 12. The CPU 11 executes the authentication program 17 read into the RAM 12, so as to realize the function to authenticate the validity of the authentication system terminal 20 to which the IC card 10 is connected. Accordingly, the authentication program 17 and the CPU constitute the validity authenticating means.

In other words, a terminal authenticating function is realized by the CPU 11 executing the authentication program 17.

The EEPROM 14 is a readable and writable nonvolatile memory that stores mostly data, such as a semiconductor memory or a flash memory. The EEPROM 14 stores a card secret key 141, a card public key 142, a card public key certificate 143 for the card public key 142, and a certification authority public key 144.

The card public key certificate 143 is a certificate for the card public key 142 signed in a predetermined format by a certification authority, for example. The card public key certificate 143 is decrypted by the certification authority public key 144, and the card public key 142 is extracted.

As will be described later, the authentication system terminal 20 and the portable checking device 30 also store some of or all of a secret key, a public key, and a public key certificate. With the use of those keys and certificate, encrypted communications are performed between the IC card 10 and the authentication system terminal 20, and the IC card 10 and the portable checking device 30.

The EEPROM 14 stores the card holder authentication information 145 of the holder of the IC card 10, such as the personal identification number and the password.

In addition to that, the EEPROM 14 stores notified party address information 146. As will be described later, the portable checking device 30 is notified of terminal authentication results with the use of the notified party address information 146 in this embodiment.

Here, the notified party address information may be the identification number of the portable checking device 30 of the ID card holder, or an e-mail address of the IC card holder, for example.

The interface unit 15 is an interface unit for connecting with the authentication system terminal 20. The contact terminal 16 is brought into contact with the contact terminal of the authentication system terminal 20, so that the IC card 10 is connected to the authentication system terminal 20.

Accordingly, the interface unit 15 controls data communications between the IC card 10 and the authentication system terminal 20 through serial input and output and the likes, so that communications can be made between the IC card 10 and the authentication system terminal 20. The IC card 10 receives a power supply from the authentication system terminal 20 via the contact terminal 16.

Although the IC card 10 shown FIG. 2 is a contact-type IC card, it may be a non-contact type IC card that has an antenna coil and makes wireless communications with the authentication system terminal 20. Alternatively, the IC card 10 may be a hybrid type IC card that has the features of both a contact type and a non-contact type, or may be of a two-way access type that can share one memory between two interface units.

Figure 3:
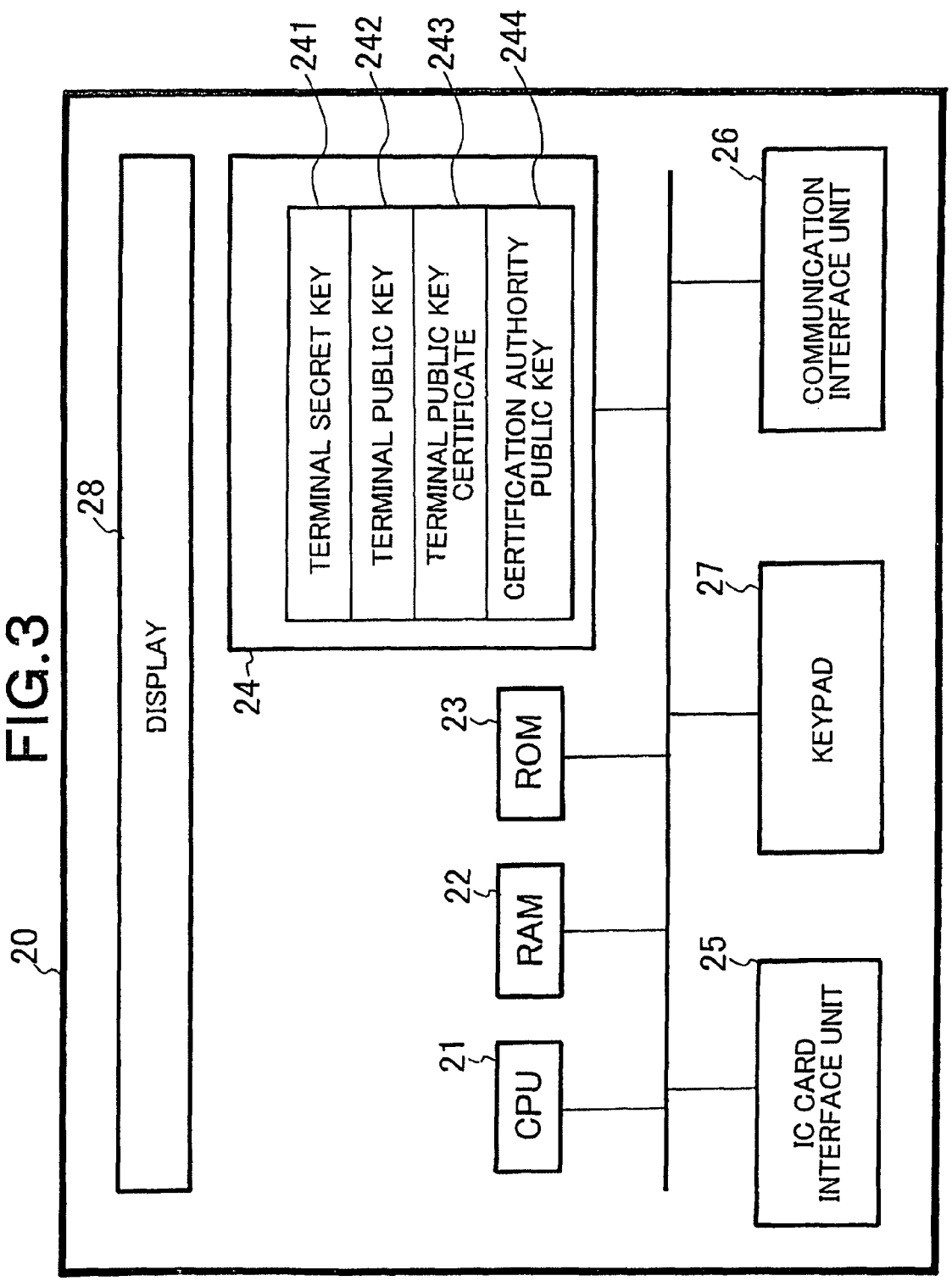
FIG. 3 is a block diagram showing an authentication system terminal in accordance with the first embodiment of the present invention.

FIG. 3 is a block diagram showing the structure of the authentication system terminal 20. The authentication system terminal 20 shown in FIG. 3 includes a CPU 21, a RAM 22, a ROM 23, an EEPROM 24, an IC card interface unit 25, a communication interface unit 26, a keypad 27, and a display 28.

The CPU 21 controls the entire authentication system terminal 20. The CPU 21 reads a program from the ROM 23 into the RAM 22, and executes the program, so as to realize the later described authenticating function.

The RAM 22 is a volatile memory that stores data and programs. The ROM 23 is a nonvolatile memory that stores programs to be executed by the CPU 21.

The EEPROM 24 stores a terminal secret key 241, a terminal public key 242, a terminal public key certificate 243, and a certification authority public key 244.

The terminal public key certificate 243 is a certificate for the terminal public key 242 signed in a predetermined format by a certification authority, for example. This terminal public key certificate 243 is decrypted with the certification authority public key 244, so that the terminal public key 242 can be extracted.

Accordingly, in this authentication system, encrypted communications are made between the authentication system terminal 20 and the IC card 10 with the use of those keys and certificate and the likes.

In this embodiment, the certification authority public key 242 stored in the authentication system terminal 20 has the same contents as the certification authority public key 144 stored in the IC card 10. Also, instead of the ROM 23 and the EEPROM 24, a storage medium such as a hard disk can be used.

The IC card interface unit 25 is an interface that performs communications between the authentication system terminal 20 and the IC card 10 inserted to the card insertion slot.

The communication interface unit 26 is an interface unit that connects the authentication system terminal 20 to the communication line 40. The communication interface unit 26 may be a modem connected to a telephone line, or a network interface unit connected to a LAN, for example. As will be described later, encrypted communications between the IC card 10 and the portable checking device 30 are performed through the communication interface unit 26 of the authentication system terminal 20.

The keypad 27 is an input unit through which information is input to the authentication system terminal 20. The user of the IC card 10 uses the keypad 27 to input the personal identification number.

The display 28 is a display unit that displays an operation instruction, a processing status, and the likes. More specifically, when the CPU 21 executes the authentication program, the result of the authentication performed on the connected IC card, a message for prompting an input of the personal identification number for user authentication, and the likes can be displayed on the display 28.

Figure 4:
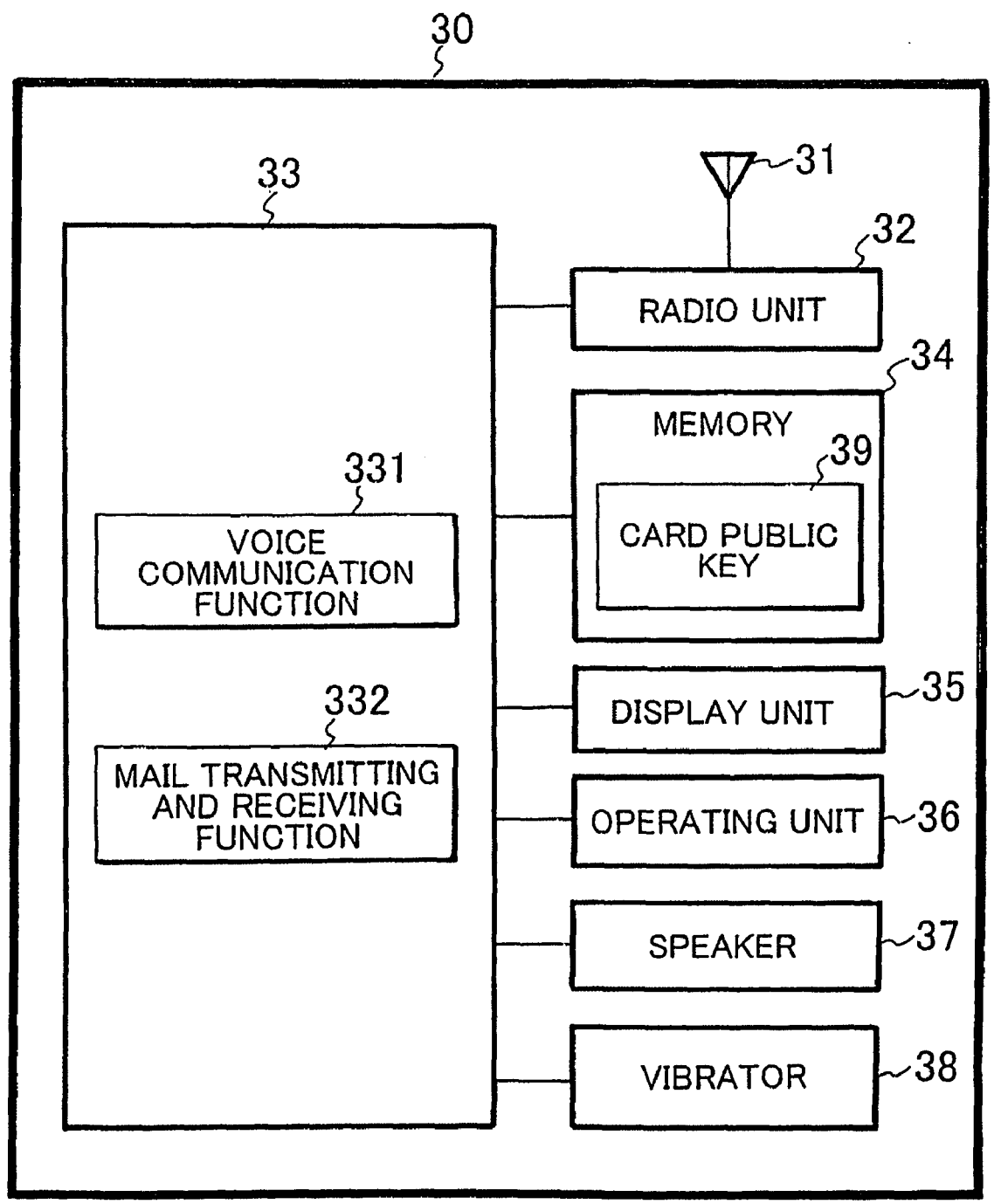
FIG. 4 is a block diagram showing a portable checking device in accordance with the first embodiment of the present invention.

FIG. 4 is a block diagram showing the structure of the portable checking device 30. Like a regular portable telephone handset, the portable checking device 30 shown in FIG. 4 includes an antenna 31 and a radio unit 32 that perform wireless communications with a base station, a control unit 33 such as a CPU that operates in accordance with a program, a memory 34, a display unit 35 formed with a liquid crystal display or the like, an operating unit 36 formed with a keyboard or the like, a speaker 37, and a vibrator 38.

The control unit 33 includes a voice communication function unit 331 and a mail transmitting and receiving function unit 332 that perform control operations for achieving the respective functions of a portable telephone handset.

In addition to the above components, the portable checking device 30 further includes a card public key 39 in which the public key data of the IC card 10 is stored. The card public key 39 is included as a component for realizing this embodiment.

The card public key 39 may be stored in the memory 34, as shown in FIG. 4. As will be described later, encrypted communications are made between the portable checking device 30 and the IC card 10 with the use of the card public key 39 in this embodiment. Therefore, the place where the card public key 39 should be stored is not particularly limited.

In this embodiment, the contents of the card public key 39 stored in the portable checking device 30 are the same as the contents of the card public key 142 stored in the IC card 10.

As described above, in this embodiment, before receiving services with the use of the IC card 10, the user inserts the IC card 10 to the authentication system terminal 20. Following the message displayed on the display 28 of the authentication system terminal 20, the user inputs the personal identification number through the keypad 27.

The authentication system terminal 20 then communicates with the IC card 10, and performs authentication of the user based on the data held by the IC card 10 or the input personal identification number or the like. After the user is authenticated, services with the use of the IC card 10 are provided to the user in this embodiment.

(Procedures for Performing Authentication in Authentication System)

Figure 5:
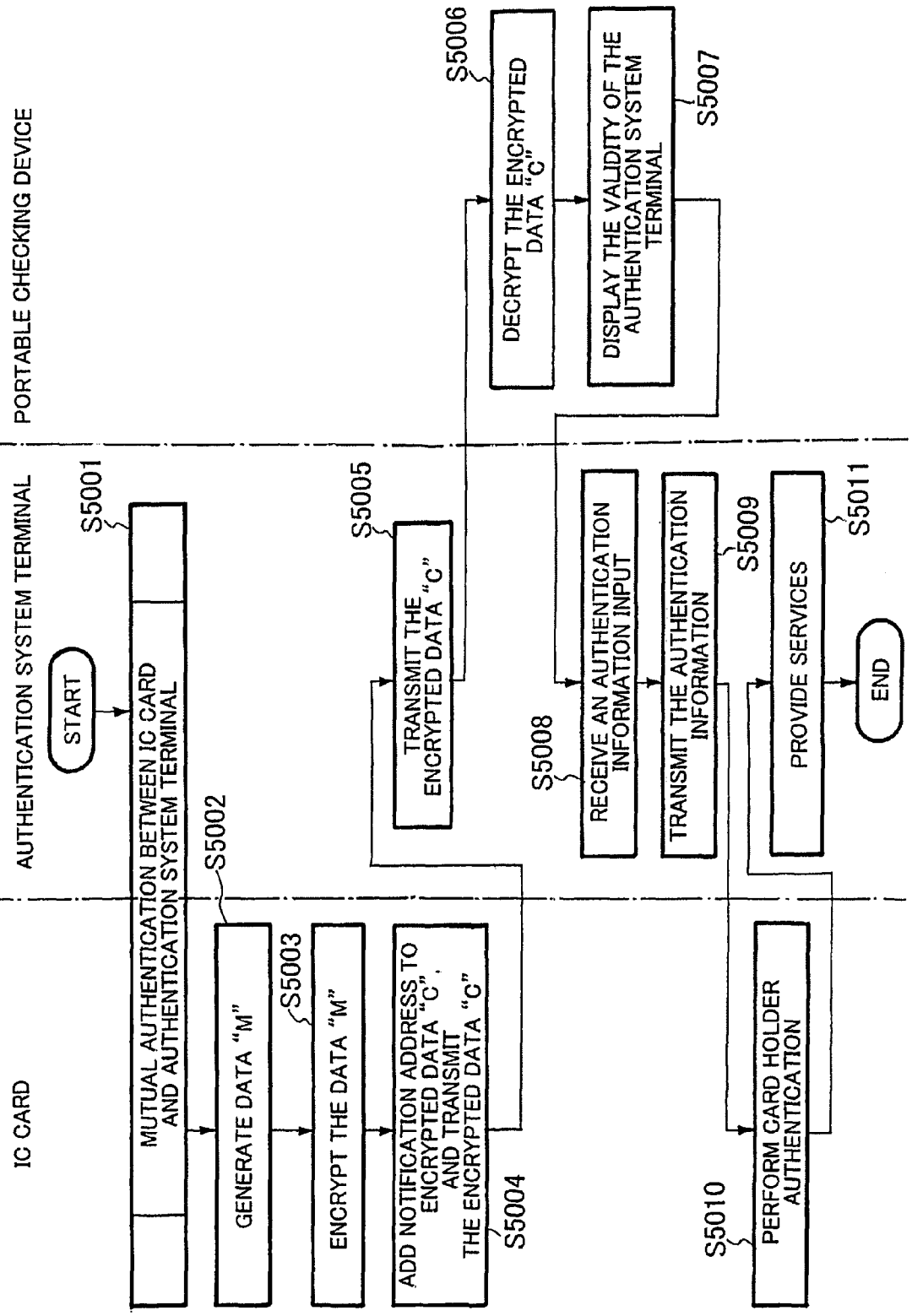
FIG. 5 is a flowchart showing the procedures for displaying the validity of identity authentication in the IC card authentication system in accordance with the first embodiment of the present invention.
Figure 6:
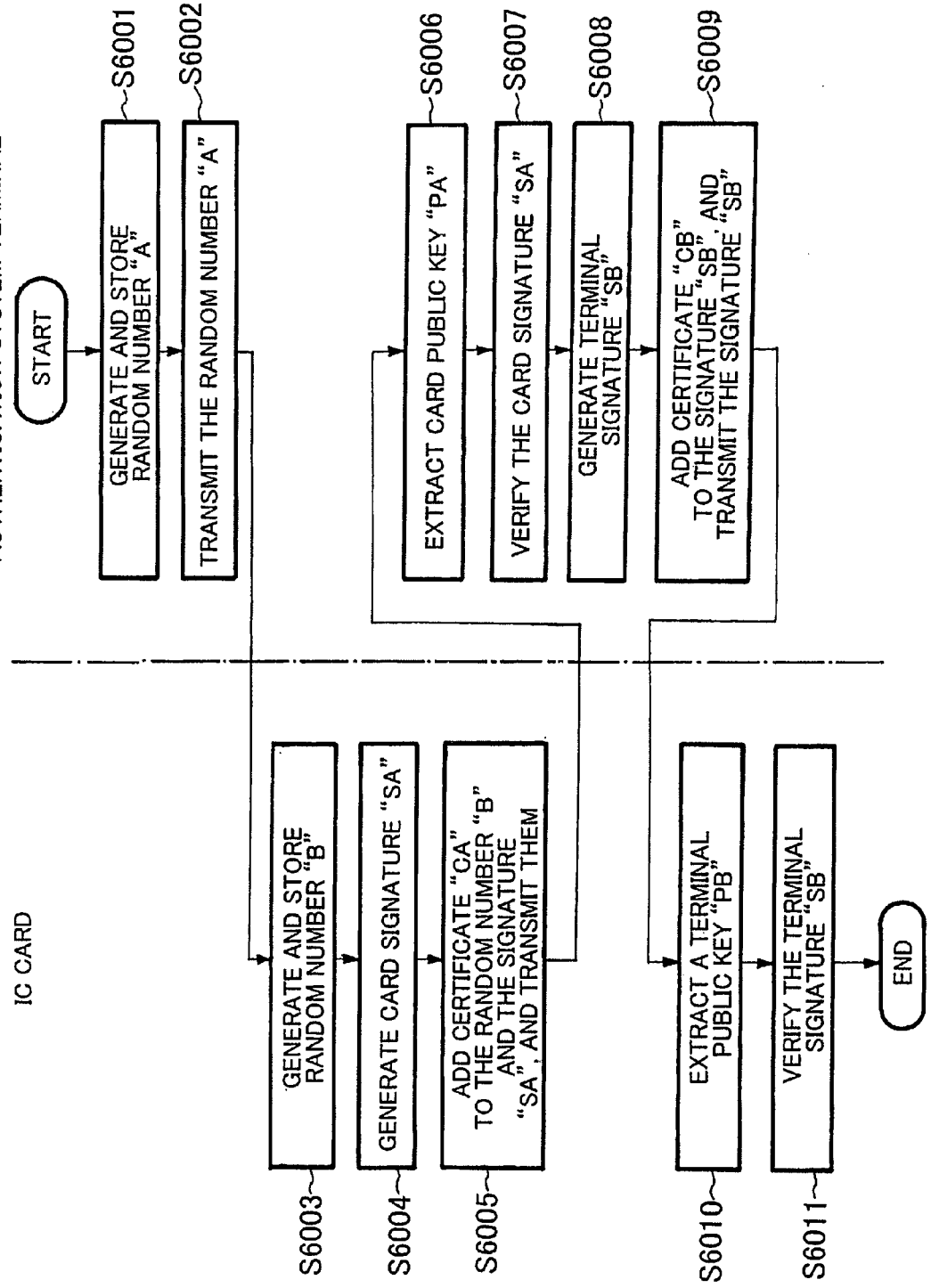
FIG. 6 is a flowchart showing the procedures for performing mutual authentication in the IC card authentication system in accordance with the first embodiment of the present invention.
Figure 7:
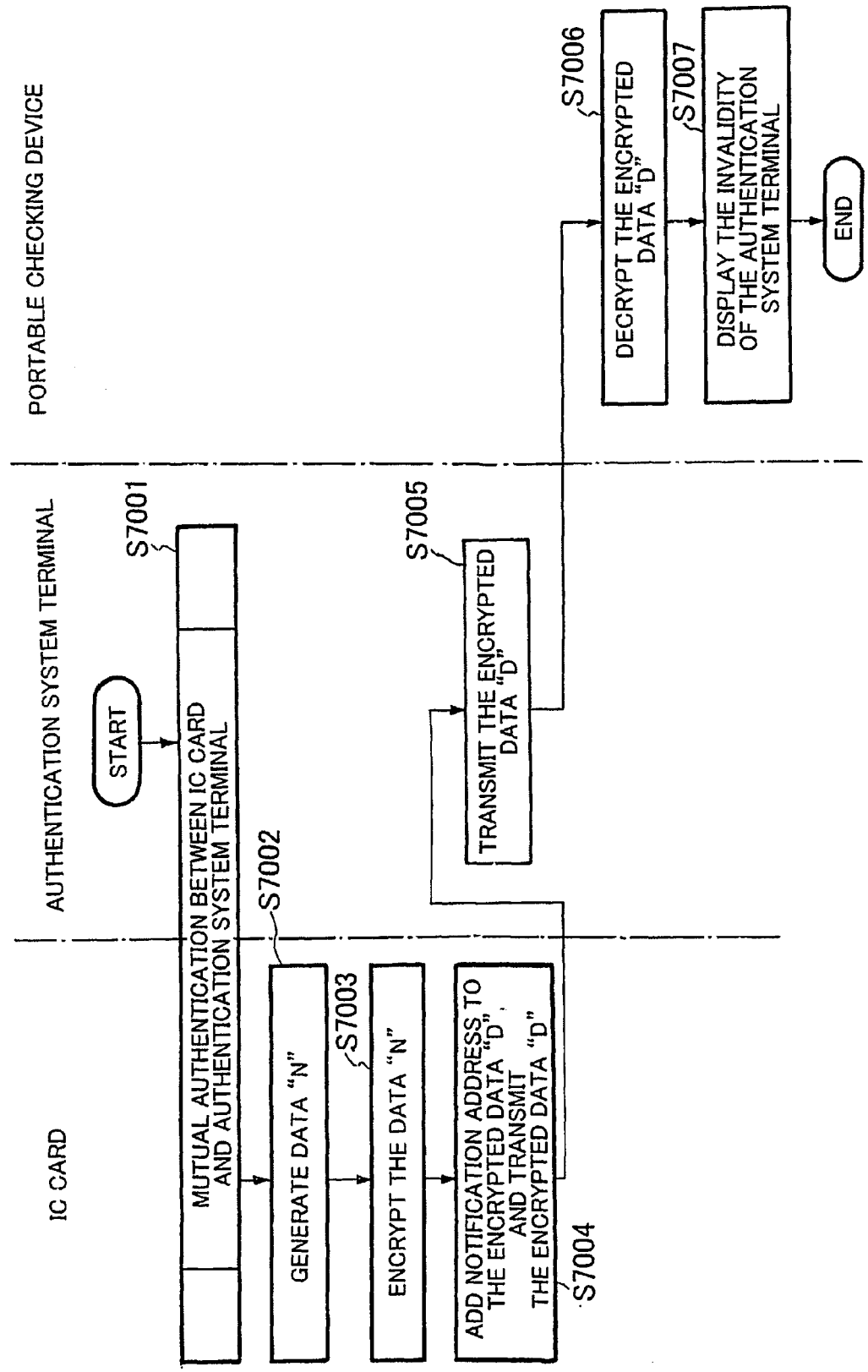
FIG. 7 is a flowchart showing the procedures for displaying the invalidity of identity authentication in the IC card authentication system in accordance with the first embodiment of the present invention.

Referring now to the flowcharts shown in FIGS. 5 through 7, the authentication procedures with the use of the IC card 10 in the authentication system shown in FIG. 1 are described.

FIG. 5 is a flowchart showing the authentication procedures to be performed after the IC card 10 is inserted to the authentication system terminal 20 until the service providing operation is performed.

When the IC card 10 is inserted to the authentication system terminal 20 by a user in this authentication system, the IC card 10 and the authentication system terminal 20 authenticate the validity of each other (S5001). This authentication procedure (the procedures for performing mutual authentication) will be described later in detail, with reference to FIG. 6.

In this authentication system, the mutual authentication between the IC card 10 and the authentication system terminal 20 is performed first (see FIG. 6), and the IC card 10 performs processing in accordance with the results of the mutual authentication.

When the validity of the authentication system terminal 20 is authenticated by the IC card 10, the IC card 10 generates the data formed with the terminal authentication result (hereinafter referred to as the data M) (S5002).

The IC card 10 encrypts the data M with the use of the card secret key 141, and generates encrypted data (hereinafter referred to as the encrypted data C) (S5003).

This encrypting operation is performed by the CPU 11 and the card secret key 141 with the use of a program stored in the ROM 13. The program, the CPU 11, and the card secret key 141 form the impersonation preventing means.

The IC card 10 adds the notification address information 146 stored in the EEPROM 14 to the encrypted data C, and transmits the encrypted data C having the notified party address information 146 to the authentication system terminal 20 (S5004).

The authentication system terminal 20 then transmits the received encrypted data C to the notified party address designated by the communication interface unit 26, so that the encrypted data C is transmitted to the portable checking device 30 via the communication line 40 (S5005).

The portable checking device 30 decrypts the received encrypted data C with the use of the card public key 39 stored in the memory 34, so as to recover the data M (S5006).

Since the data M can be recovered from the encrypted data C, the validity of the authentication system terminal 20 is authenticated. Accordingly, the portable checking device 30 indicates that the validity has been authenticated on the display unit 35 of the portable checking device 30 (S5007).

The CPU of the control unit 33, the program for activating the CPU (recorded in the control unit), and the card public key 39 form a verifying means. The display unit 35 serves as a verification result output means.

More specifically, the portable checking device 30 displays "The validity of the authentication system terminal 20 has been authenticated" on the display unit 35.

The user then confirms the validity of the authentication system terminal 20 with the restored data M. After that, the user inputs the authentication information such as the personal identification number or the password to the authentication system terminal 20 through the keypad 27 (S5008).

When the authentication information is input by the user, the authentication system terminal 20 adds the input authentication information to an identity authentication request, and transmits the authentication information to the IC card 10 (S5009). The transmission is performed through the communication interface unit 26 that serves as the authentication information output means.

The IC card 10 compares the received authentication information with the card holder authentication information 145 stored in the EEPROM 14, and then authenticates the validity of the user (the identity authentication) (S5010).

The CPU 11, the ROM card holder authentication information 145, the program that is stored in the ROM 13 and activates the CPU 11, and the interface unit 15 constitute the identity authentication output means.

The result of the identity authentication performed on the user by the IC card 10 is returned to the authentication system terminal 20, and various services are provided to the user with the IC card 10 in accordance with the result (S5011). Here, the CPU 21 is activated in accordance with the program recorded on the ROM 23, and the services are provided based on the information stored in the EEPROM 24 or the RAM 22. The program recorded on the ROM 23, the CPU 21, the EEPROM 24, and the RAM 22 constitute the service provision starting means.

As described above, the results of the mutual authentication between the IC card 10 and the authentication system terminal 20 are encrypted in the IC card 10, and are decrypted to the data M in the portable checking device 30. In this manner, the contents of the mutual authentication results aren't leaked to a third party, and the user can confirm the validity of the authentication system terminal 20 before inputting the authentication information.

Next, the mechanism for performing mutual validity authentication between the IC card 10 and the authentication system terminal 20 (the above mentioned mutual authentication) is described.

FIG. 6 is a flowchart showing the procedures for performing mutual authentication between the IC card 10 and the authentication system terminal 20.

First, the authentication system terminal 20 performs internal authentication of the IC card 10. In doing so, the authentication system terminal 20 generates a random number (a random number A), and stores the random number A into the RAM 22 in the authentication system terminal 20 (S6001).

The authentication system terminal 20 then transmits the generated random number A to the IC card 10 (S6002).

Receiving the random number A, the IC card 10 generates a new random number B, and stores the random number A and the random number B into the RAM 12 in the IC card 10 (S6003).

Using the card secret key 141, the IC card 10 generates the signature for the data formed with the random number A (hereinafter referred to as the card signature SA) (S6004).

The signature for the data A is generated by performing hashing operation on the data A formed with the random number A and encrypting the obtained hash value with the card secret key 141 of the IC card 10.

The IC card 10 adds the card public key certificate 143 that is a certificate issued by a certification authority for the card public key 142 to the IC card 10, to the random number B and the card signature SA. The IC card 10 then transmits the random number B and the card signature SA to the authentication system terminal 20 (S6005).

Here, the card public key certificate 143 is a certificate CA. The card public key 142 that is the public key to the IC card 10 is a card public key PA.

The authentication system terminal 20 extracts the card public key PA to the IC card 10 from the received certificate CA (S6006), and performs verification of the card signature SA (S6007).

The verification of the card signature SA is carried out by performing hashing operation on the data A formed with the random number A stored in the RAM 22 in the authentication system terminal 20 and determining whether the obtained hash value is the same as the value obtained by decrypting the card signature SA of the IC card 10 with the card public key PA to the IC card 10.

The authentication system terminal 20 authenticates the validity of the IC card 10 through the verification of the card signature SA.

Next, authentication of the authentication system terminal 20 by the IC card 10 is carried out.

Using the terminal secret key 241 stored in the EEPROM 24, the authentication system terminal 20 generates the signature for the data formed with the random number B (hereinafter referred to the terminal signature SB) (S6008).

The authentication system terminal 20 adds the terminal public key certificate 243 that is the certificate for the terminal public key 242 to the authentication system terminal 20, to the terminal signature SB. The authentication system terminal 20 then transmits the terminal signature SB to the IC card 10 (S6009).

Here, the terminal public key 242 to the authentication system terminal 20 is a terminal public key PB, and the terminal public key certificate 243 is a certificate CB.

The IC card 10 extracts the terminal public key PB to the authentication system terminal 20 from the received certificate CB (S6010), and carries out verification of the terminal signature SB (S6011).

Like the verification of the card signature SA, the verification of the terminal signature SB is carried out by performing hashing operation on the data formed with the random number B stored in the RAM 12 in the IC card 10 and determining whether the obtained hash value is the same as the value obtained by decrypting the terminal signature SB with the terminal public key PB.

In this manner, the IC card 10 performs authentication of the validity of the authentication system terminal 20 through the verification of the terminal signature SB.

The procedures for performing mutual authentication between the IC card 10 and the authentication system terminal 20 in accordance with this embodiment have been described, but authentication may be carried out with a common key, instead of the above described public keys. In such a case, the IC card 10 and the authentication system terminal 20 use a common secret key, and perform encrypting and decrypting on data.

As described above, in this authentication system, before the user inputs the personal identification number, the results of validity authentication performed by the IC card 10 and the authentication system terminal 20 are transmitted to the portable checking device 30 that is always carried by the user.

Accordingly, in a case where the portable checking device 30 does not receive the result of validity authentication of the authentication system terminal 20 (the result of mutual authentication or the data M), the user determines that the authentication system terminal 20 is not trustworthy, and refrains from inputting the personal identification number that is the authentication information.

Alternatively, in a case where decrypting the encrypted data C reveals that the decrypted data is data whose validity is not authenticated (data other than the data M) even though the portable checking device 30 receives the authentication result of the authentication system terminal 20, the portable checking device 30 can indicate the invalidity of the authentication system terminal 20.

Referring now to the flowchart showing in FIG. 7, the procedures to be carried out until the portable checking device 30 indicates the invalidity are described.

When the user inserts the IC card 10 to the authentication system terminal 20, mutual validity authentication is started between the IC card 10 and the authentication system terminal 20 (S7001).

In this authentication system, mutual authentication is performed between the IC card 10 and the authentication system terminal 20, and services are provided in accordance with the result of the mutual authentication. Accordingly, in a case where the IC card 10 does not authenticate the validity of the authentication system terminal 20, the IC card 10 generates the data formed with the authentication result indicating the invalidity (hereinafter referred to as the data N) (S7002).

The IC card 10 encrypts the data N with the use of the card secret key 141, and generates encrypted data (hereinafter referred to as the encrypted data D) (S7003).

The IC card 10 adds the notification address information 146 stored in the EEPROM 14 to the encrypted data D, and sends the encrypted data D having the notified party address information 146 the authentication system terminal 20 (S7004).

The authentication system terminal 20 transmits the received encrypted data D to the notified party address designated through the communication interface unit 26, so that the encrypted data D is transmitted to the portable checking device 30 via the communication line 40 (S7005).

The portable checking device 30 decrypts the received encrypted data D with the use of the card public key 39 stored in the memory 34, so as to recover the data N (S7006).

The data N from the encrypted data D indicates that the validity of the authentication system terminal 20 is not authenticated and the authentication system terminal 20 is invalid. The portable checking device 30 then causes the display unit 35 to display the message indicating that the authentication system terminal 20 is invalid (S7007).

More specifically, the portable checking device 30 displays the message, "the validity of the authentication system terminal 20 has not been authenticated", on the display unit 35.

Accordingly, based on the recovered data, if the mutually authenticated data M is recovered, the portable checking device 30 displays the validity of the authentication system terminal 20 and if the mutually unauthenticated data N is recovered, the portable checking device 30 displays the invalidity of the authentication system terminal 20.

In this manner, the user can be protected from the danger of inputting the personal identification number, which is the authentication information about the user, to the authentication system terminal 20 that aims to wrongfully obtain the personal identification number as the authentication information.

Since the existing IC card 10 and the existing authentication system terminal 20 can be used as they are in this embodiment, the above described effects can be achieved without any cost to change the existing system resource.

After the IC card 10 and the authentication system terminal 20 of this embodiment authenticate the validity of each other (the above described mutual authentication), it is possible to generate and encrypt data that includes the results of the mutual authentication between the authentication system terminal 20 and the IC card 10, and the time of the mutual authentication.

In such a case, since the encrypted data includes the time of the mutual authentication, the user can check the time of the mutual authentication with the portable checking device 30. Accordingly, it is possible to prevent generation of fake authentication result data indicating the validity of the authentication system terminal 20.

Further, an expiration date may be set in the time of the mutual authentication, and the IC card 10 may receive authentication information and perform identity authentication only before the expiration date.

In this embodiment, the authentication information including a password, a personal identification number, or the like is input. However, the card holder authentication information 145 stored in the IC card 10 of this embodiment may be biometrics information such as a fingerprint, a voiceprint, a face, a retina pattern, or an iris code.

In such a case, the keypad 27 of the authentication system terminal 20 is an input device such as a sensor that reads fingerprints, a microphone that picks up voices, or a camera. The IC card 10 checks the data that is input through such an input device, so as to perform more reliable identity authentication.

In this embodiment, the portable checking device 30 may use a speaker or a vibrator as the means of showing the user the validity authentication result of the authentication system terminal 20, other than the display.

Also, the portable checking device 30 decrypts the encrypted data C, and identity authentication is performed by the IC card 10 in this embodiment. However, the present invention is not limited to that, and the data M formed with a mutual authentication result may be encrypted after the IC card 10 performs authentication of the validity of the authentication system terminal 20 (the above described mutual authentication). The data M may be then transmitted to the designated portable checking device 30, and the encrypted data C may be decrypted by the portable checking device 30. Also, the card holder authentication information 145 stored in the IC card 10 may be transferred to the authentication system terminal 20, and identity authentication may be performed by the authentication system terminal 20, instead of the IC card 10.

In this case, a complicated biometrics information checking operation that cannot be performed or takes a long period of time with the limited hardware resource of the IC card 10 can be performed by the authentication system terminal 20 whose validity has been authenticated.

Further, even if the time of contact between the authentication system terminal 20 and the IC card 10 such as a non-contact IC card is very short, user validity information can be performed by the authentication system terminal 20 whose validity has been mutually authenticated after a communication between the IC card 10 and the authentication system terminal 20 is ended.

Also, the IC card 10 stores the notification address information 146 about the portable checking device 30 in this embodiment. However, the present invention is not limited to that, and it is possible to set a reliable verification device placed on a communication line, instead of the portable checking device 30, as a notification destination.

Figure 8:
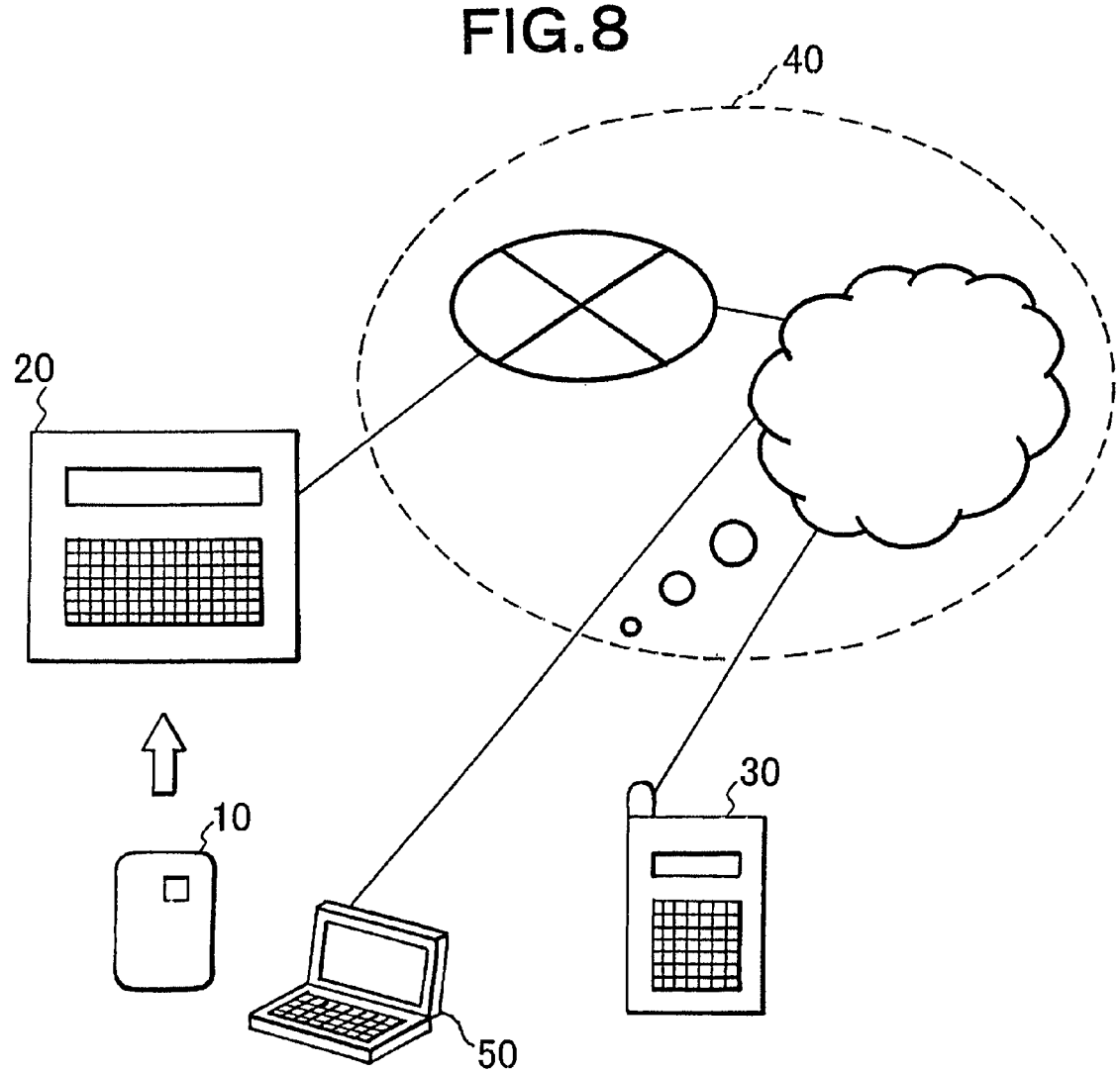
FIG. 8 is a schematic view showing a structure in which a verification device is added to the IC card authentication system in accordance with the first embodiment of the present invention.

FIG. 8 shows a structure having this verification device added thereto. In FIG. 8, the same components as those described so far are denoted by the same reference numerals as those used so far. The authentication system using an IC card shown in FIG. 8 includes an IC card 10, an authentication system terminal 20, a portable checking device 30, a communication line 40, and a verification device 50 that is connected to the IC card 10 and the portable checking device 30 through the communication line 40, and can communicate with the IC card 10 and the portable checking device 30.

In this case, the verification device 50 may operate to transmit the encrypted data C to the portable checking device 30 linked to the IC card 10. More specifically, the reliable verification device 50 verifies and decrypts the encrypted data C, and can transmit the restored data M to the portable checking device 30.

With this arrangement, the portable checking device 30 does not need to store the card public key 39, and the above described effects can be achieved by the user simply registering the address of the portable checking device 30 with the reliable verification device 50.

Also, in a case where an e-mail address of the portable checking device 30 of the IC card holder or an e-mail address of the holder of the IC card 10 is registered with the notification address information 146 in this embodiment, the encrypted data C generated by the IC card 10 is transmitted to the holder of the IC card 10 when the IC card 10 is being wrongfully used by a third party. Accordingly, the holder of the IC card 10 can be promptly notified of the unauthorized use of the IC card 10.

In the first embodiment, the IC card 10 performs identity authentication with the use of the authentication information obtained through the authentication system terminal 20 and the card holder authentication information 145 registered in the IC card 10, and then provides various services. However, the present invention is not limited to that arrangement, and the IC card 10 may be of a non-contact type, and such a non-contact IC card may be provided in a portable terminal.

In this case, the connection terminal 16 of the IC card 10 and the IC card interface unit 25 of the authentication system terminal 20 further include a wireless communication function that can perform non-contact communications. With the non-contact IC card being provided in a portable terminal, it is possible to form a non-contact IC card equipped terminal that includes the non-contact IC card.

With this arrangement, the non-contact IC card equipped terminal can display the result of authentication of the IC card on the non-contact IC card equipped terminal.

Second Embodiment

Next, a second embodiment of the present invention is described, with reference to the accompanying drawings.

FIG. 9 is a schematic view of the structure of an authentication system that uses an IC card in accordance with the second embodiment. The authentication system that uses an IC card shown in FIG. 9 includes an IC card 10a, an authentication system terminal 20a, and a portable checking device 30a.

To receive various services through the IC card 10a, a user inserts the IC card 10a to the authentication system terminal 20a. After the IC card 10a is returned from the authentication system terminal 20a, the user inserts the IC card 10a to the portable checking device 30a. Following the information displayed on the portable checking device 30a, the user inputs a password (or the authentication information) through the keypad of the authentication system terminal 20a.

Using the input password, the authentication system terminal 20a performs identity authentication on the user. After succeeding in the identity authentication, the authentication system terminal 20a provides the user with various services through the IC card 10a.

Figure 10:
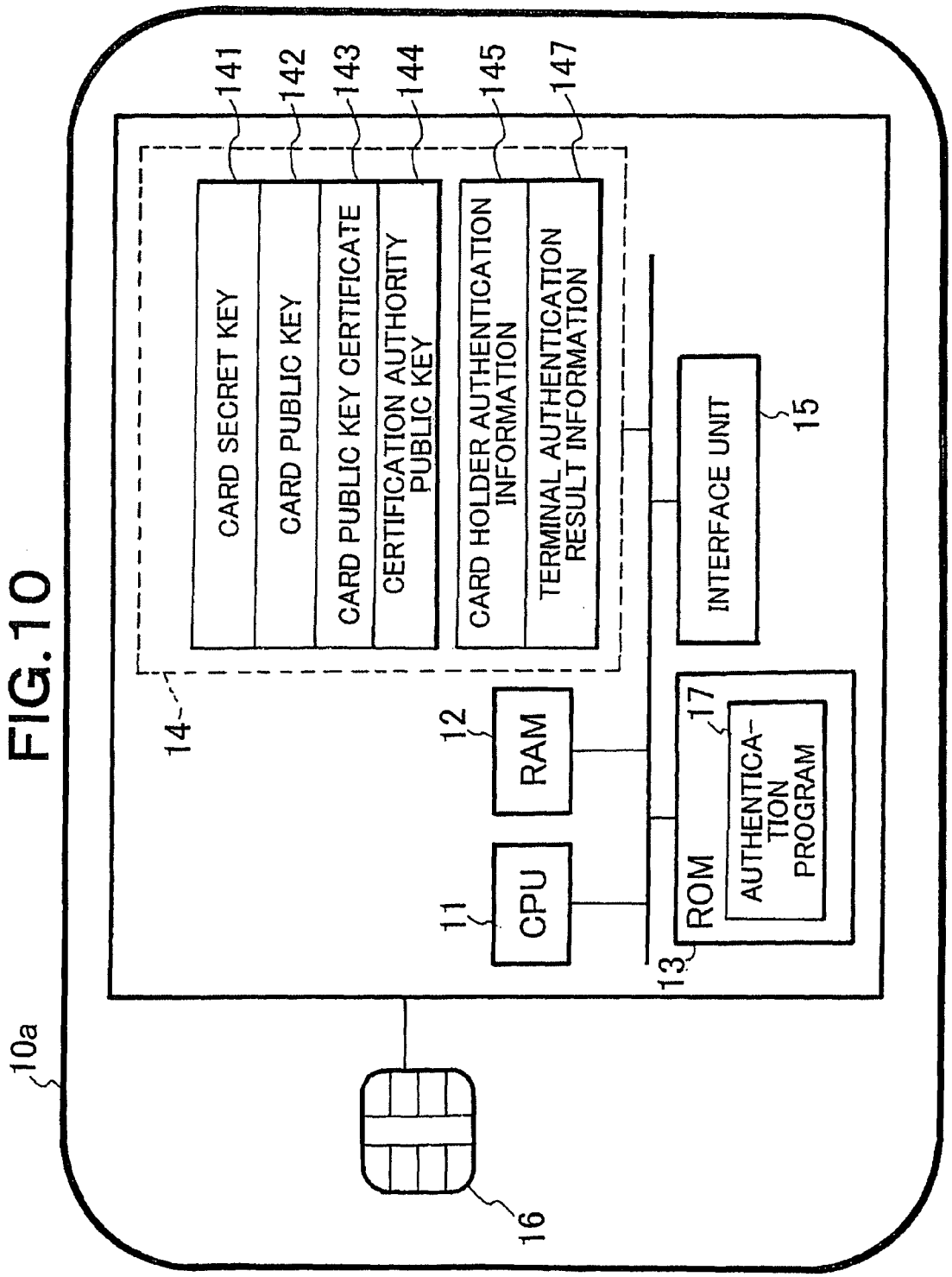
FIG. 10 is a block diagram showing the structure of an IC card in accordance with the second embodiment of the present invention.

FIG. 10 is a block diagram showing the structure of the IC card 10a. Instead of the notification address information 146, terminal authentication result information 147 that is an element for realizing the second embodiment is stored in the EEPROM 14, which differs from the structure shown in FIG. 2.

Figure 11:
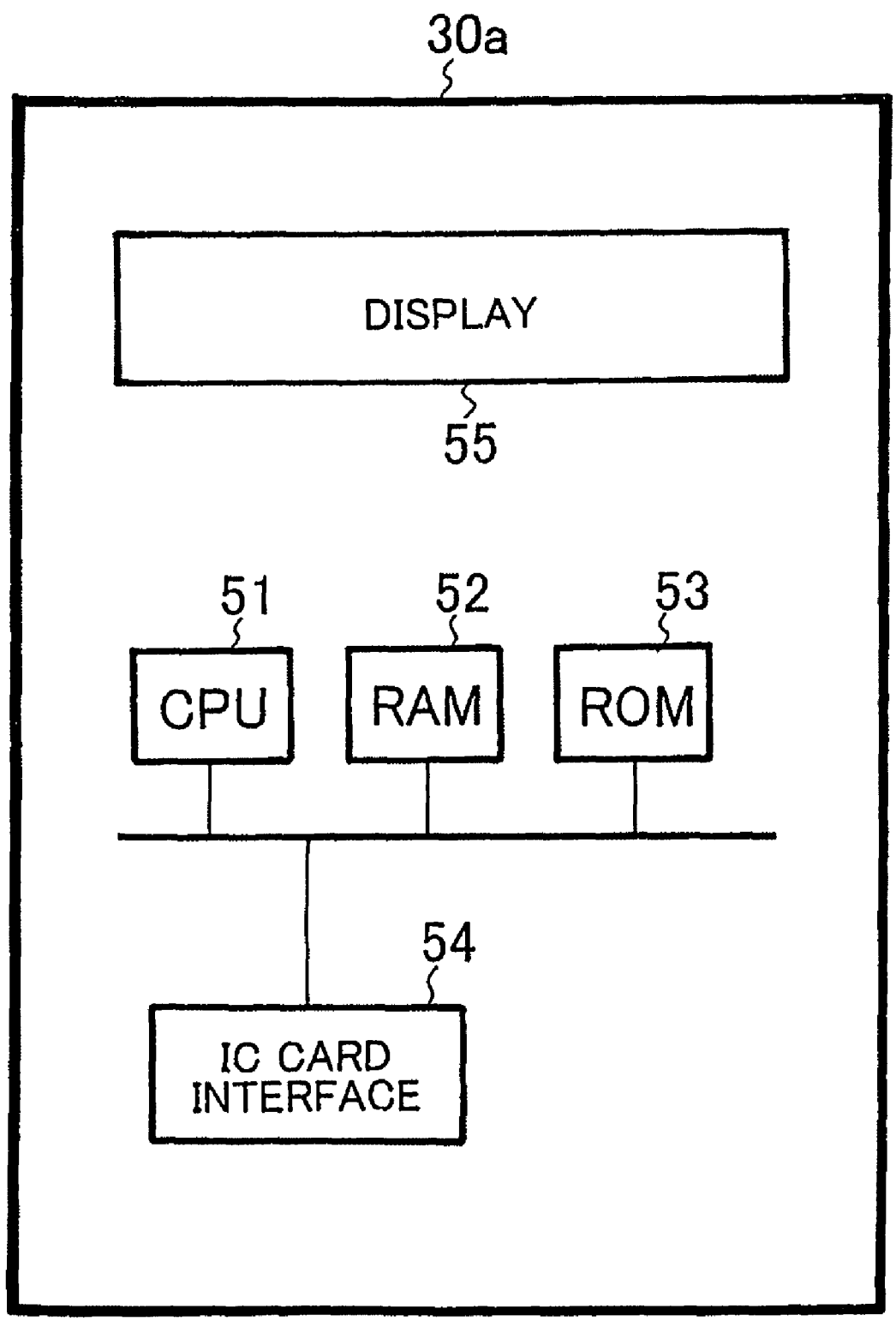
FIG. 11 is a block diagram showing a portable checking device in accordance with the second embodiment of the present invention.

FIG. 11 is a block diagram showing the structure of the portable checking device 30a. As shown in FIG. 11, in addition to the CPU 51, the RAM 52, and the ROM 53, the portable checking device 30a includes an IC card interface unit 54 and a display 55 that are elements for realizing the second embodiment.

As described above, in the second embodiment, before receiving services, the user inserts the IC card 10a to the authentication system terminal 20a, and the validity of the authentication system terminal 20a is authenticated. In accordance with the mutual authentication result, the authentication result is stored in the terminal authentication result information 147 in the IC card 10a, and the card holder authentication information 145 of the IC card 10a is transferred to the authentication system terminal 20a.

After the IC card 10a is returned from the authentication system terminal 20a to the user, the user inserts the IC card 10a to the portable checking device 30a, and the terminal authentication result information 147 of the IC card 10a is read into the portable checking device 30a through the IC card interface unit 54. If the user confirms the result of the validity authentication of the authentication system terminal 20a displayed on the display 55 of the portable checking device 30a, the user inputs the personal identification number through the keypad 27 of the authentication system terminal 20a.

In this manner, the authentication system terminal 20a performs identity authentication of the user, with the use of the card holder authentication information 145 received beforehand from the IC card 10a and the input personal identification number.

After the user is authenticated in the above manner, the authentication system in accordance with the second embodiment provides the user with various services through the IC card 10a.

The exemplary embodiments of the present invention are described above, but the present invention can be embodied in various forms without departing from the spirit and the main characteristic defined by the claims of the present application. For this reason, the embodiments should be considered to be illustrative and not restrictive. The scope of the invention is indicated by the appended claims rather than by the description and the abstract. All variations and modifications within the range of equivalency of the claims are therefore intended to be embraced in the present invention.

The invention claimed is:

1. A validity checking system comprising:
an information processing card that has an information processing function; and
an authentication system that performs mutual authentication with the information processing card,
wherein
the information processing card includes:
a validity authenticating unit that authenticates validity of the authentication system; and
an impersonation preventing unit that carries out an impersonation preventing process on a result of the authentication performed by the validity authenticating unit, and
the validity checking system further comprises a checking device remotely connected with the authentication system,
the checking device including:
a verifying unit that receives the authentication result that is subjected to the impersonation preventing process and is output from the information processing card, and verifies the authentication result; and
a verification result output unit that outputs a result of the verification performed by the verifying unit to a user in a perceptible manner.

2. The validity checking system according to claim 1, wherein:
the authentication system receives the authentication result subjected to the impersonation preventing process from the information processing card, and sends the authentication result subjected to the impersonation preventing process to the checking device; and
the checking device receives the authentication result subjected to the impersonation preventing process from the authentication system.

3. The validity checking system according to claim 1, wherein:
the authentication system further includes:
an authentication information output unit that outputs authentication information to the information processing card, the authentication information being for authenticating an identity that is input based on the verification result supplied from the verifying unit; and
a service provision starting unit that receives a result of the identity authentication from the information processing card, and provides a predetermined service based on the result of the identity authentication; and
the information processing card further includes
an identity authentication output unit that compares the authentication information that is output from the authentication information output unit of the authentication system with card holder authentication information registered in the information processing card, and outputs a result of the identity authentication to the authentication system based on a result of the comparison.

4. The validity checking system according to claim 1, wherein:
the information processing card sends registered card holder authentication information to the authentication system, based on the authentication result; and
the authentication system further includes: an identity authenticating unit that compares authentication information that is input based on the result of the verification performed by the verifying unit with the card holder authentication information received from the information processing card, and performs identity authentication based on a result of the comparison, the authentication information being for authenticating an identity; and
a service provision starting unit that provides a predetermined service based on a result of the identity authentication.

5. The validity checking system according to claim 1, wherein the information processing card further includes an authentication result storing unit that stores the authentication result.

6. The validity checking system according to claim 1, wherein the impersonation preventing unit performs encrypting or digital signature processing on the authentication result.

7. The validity checking system according to claim 1, wherein the authentication result includes a time at which validity of the authentication system is authenticated.

8. An information processing card that is used in the validity checking system according to claim 1,
the information processing card comprising:
a validity authenticating unit that authenticates validity of an authentication system;
an impersonation preventing unit that carries out an impersonation preventing process on a result of the authentication performed by the validity authenticating unit; and
an authentication result output unit that outputs the authentication result subjected to the impersonation preventing process to outside.

9. A checking device that is used in the validity checking system according to claim 7,
the checking device comprising:
a verifying unit that verifies an authentication result subjected to an impersonation preventing process; and
an output unit that outputs a result of the verification performed by the verifying unit, to a user in a perceptible manner.

10. An authentication system that is used in the validity checking system according to claim 1,
the authentication system comprising:
an authentication result acquiring unit that acquires an authentication result subjected to an impersonation preventing process from an information processing card; and
an authentication result transferring unit that transfers the authentication result that is subjected to the impersonation preventing process and is acquired by the authentication result acquiring unit, to a checking device.

11. An authentication system that is used in the validity checking system according to claim 1,
the authentication system comprising:
an authentication information output unit that outputs authentication information that is input based on a result of verification performed by a verifying unit of a checking device, to an information processing card;
an identity authentication receiving unit that receives a result of identity authentication from the information processing card; and
a service provision starting unit that provides a predetermined service, based on the received result of the identity authentication.

12. An authentication system that is used in the validity checking system according to claim 1,
the authentication system further comprising an identity authenticating unit that compares authentication information with card holder authentication information, and performs identity authentication based on a result of the comparison, the authentication information being input based on a result of verification performed by the verifying unit of the checking device, the card holder authentication information being received from the information processing card.

13. A validity checking system comprising:
an information processing card that has an information processing function; and
an authentication system that performs mutual authentication with the information processing card,
wherein
the information processing card includes:
a validity authenticating unit that authenticates validity of the authentication system; and
an impersonation preventing unit that performs an impersonation preventing process on a result of the authentication performed by the validity authenticating unit, and
the validity checking system further comprises:
a verification device that includes a verifying unit that receives the authentication result that is subjected to the impersonation preventing process and is output from the information processing card, and verifies the authentication result; and
a checking device remotely connected with the authentication system, which checking device includes a verification result output unit that outputs a result of the verification received from the verification device to a user in a perceptible manner.

14. A validity checking method that is used in a validity checking system that includes an information processing card, an authentication system that performs mutual authentication with the information processing card, and a checking device that receives information output from the information processing card,
the validity checking method comprising:
a validity authenticating step of authenticating validity of the authentication system, the validity authenticating step being carried out by the information processing card;
an impersonation preventing step of carrying out an impersonation preventing process on a result of the authentication performed in the validity authenticating step, the impersonation preventing step being carried out by the information processing card;
an authentication result outputting step of outputting the authentication result subjected to the impersonation preventing process to outside, the authentication result outputting step being carried out by the information processing card;
a verifying step of receiving the authentication result that is subjected to the impersonation preventing process and is output from the information processing card, and verifying the authentication result, the verifying step being carried out by the checking device that is remotely connected with the authentication system; and
a verification result outputting step of outputting a result of the verification performed in the verifying step to a user in a perceptible manner, the verification result outputting step being carried out by the checking device.

15. The validity checking method according to claim 14, wherein:
the information processing card sends the authentication result subjected to the impersonation preventing process to the authentication system in the authentication result outputting step; and
the validity checking method further comprises
an authentication result transferring step of receiving the authentication result subjected to the impersonation preventing process by the information processing card, and transferring the authentication result to the checking device, the authentication result transferring step being carried out by the authentication system prior to the verifying step.

16. The validity checking method according to claim 14, further comprising:
an authentication information outputting step of outputting authentication information for authenticating an identity to the information processing card, the authentication information being input based on the verification result that is output in the verification result outputting step, the authentication information outputting step being carried out by the authentication system;
an identity authentication outputting step of performing identity authentication by comparing the authentication information output from the authentication system in the authentication information outputting step with card holder authentication information registered in the information processing card, and sending a result of the identity authentication to the authentication system based on a result of the comparison, the identity authentication outputting step being carried out by the information processing card; and
a service provision starting step of receiving the identity authentication result from the information processing card, and providing a predetermined service based on the identity authentication result, the service provision starting step being carried out by the authentication system.

17. The validity checking method according to claim 14, further comprising:
a card holder authentication information outputting step of sending stored card holder authentication information to the authentication system, based on the authentication result, the card holder authentication information outputting step being carried out by the information processing card;
an identity authenticating step of comparing authentication information for authenticating an identity that is input based on the verification result output from the verification result outputting step, with the card holder authentication information received from the information processing card, and authenticating an identity based on a result of the comparison, the identity authenticating step being carried out by the authentication system; and
a service provision starting step of providing a predetermined service based on a result of the identity authentication, the service provision starting step being carried out by the authentication system.

18. The validity checking method according to claim 14, further comprising
an authentication result storing step of storing the authentication result, the authentication result storing step being carried out by the information processing card.

19. The validity checking method according to claim 14, wherein the impersonation preventing step includes performing encrypting or digital signature processing on the authentication result.

20. The validity checking method according to claim 14, wherein the authentication result includes a time at which validity of the authentication system is authenticated.

21. A validity checking method that is used in a validity checking system that includes an information processing card, an authentication system that performs mutual authentication with the information processing card, a verification device that receives information output from the information processing card, and a checking device that receives a verification result output from the verification device, the validity checking method comprising:
- a validity authenticating step of authenticating validity of the authentication system, the validity authenticating step being carried out by the information processing card;
- an impersonation preventing step of carrying out an impersonation preventing process on a result of the authentication performed in the validity authenticating step, the impersonation preventing step being carried out by the information processing card;
- an authentication result outputting step of outputting the authentication result subjected to the impersonation preventing process to the verification device, the authentication result outputting step being carried out by the information processing card;
- a verifying step of verifying the authentication result subjected to the impersonation preventing process, the verifying step being carried out by the verification device;
- a first verification result outputting step of sending the verification result to the checking device that is remotely connected with the authentication system, the first verification result outputting step being carried out by the verification device; and
- a second verification result outputting step of outputting the verification result to a user in a perceptible manner, the second verification result outputting step being carried out by the checking device.

22. The information processing card according to claim 8, wherein the impersonation preventing unit performs encrypting or digital signature processing on the authentication result.

23. The information processing card according to claim 8, wherein the authentication result includes a time at which validity of the authentication system is authenticated.

24. The information processing card according to claim 8, wherein stored card holder authentication information is transmitted to outside, based on the authentication result.

25. The information processing card according to claim 8, further comprising:
- an authentication result storing unit that stores the authentication result.

* * * * *